United States Patent
Richter

(10) Patent No.: US 7,011,279 B2
(45) Date of Patent: Mar. 14, 2006

(54) SUPPORT DEVICE WITH FLEXIBLE SUPPORT ARM

(76) Inventor: Harald Richter, Höhenstrasse 32, 75331 Engelbrand (DE)

( * ) Notice: Subject to any disclaimer, the term of this patent is extended or adjusted under 35 U.S.C. 154(b) by 20 days.

(21) Appl. No.: 10/870,994

(22) Filed: Jun. 21, 2004

(65) Prior Publication Data

US 2005/0194501 A1  Sep. 8, 2005

(51) Int. Cl.
*F16M 13/00* (2006.01)
(52) U.S. Cl. .................................. 248/160; 248/274.1
(58) Field of Classification Search ............... 248/160, 248/159, 158, 81, 104, 274.1
See application file for complete search history.

(56) References Cited

U.S. PATENT DOCUMENTS

| 2,481,271 A | * | 9/1949 | Willey ......................... 248/159 |
| 2,558,763 A | * | 7/1951 | Lee ............................. 267/152 |
| 2,584,015 A | * | 1/1952 | Hawes ...................... 248/354.4 |
| 3,180,600 A | * | 4/1965 | Kopec ........................ 248/104 |
| 4,023,757 A | * | 5/1977 | Allard et al. ................. 248/70 |
| 4,073,254 A | * | 2/1978 | Marker ......................... 114/90 |
| 4,842,174 A | * | 6/1989 | Sheppard et al. ........... 224/548 |
| 5,179,387 A | * | 1/1993 | Wells ......................... 343/895 |
| 5,229,784 A | * | 7/1993 | Jones ......................... 343/888 |
| 5,383,633 A | * | 1/1995 | Ellestad ...................... 248/160 |
| 5,842,670 A | * | 12/1998 | Nigoghosian ............... 248/160 |
| 6,032,910 A | * | 3/2000 | Richter ..................... 248/274.1 |
| 6,698,044 B1 | * | 3/2004 | Greenfield et al. ......... 248/104 |
| 6,749,160 B1 | * | 6/2004 | Richter ..................... 248/206.2 |

* cited by examiner

*Primary Examiner*—Anita M. King
(74) *Attorney, Agent, or Firm*—Klaus J. Bach

(57) ABSTRACT

In a support device with a flexible support arm including a mounting structure for mounting the support device to a base, a support structure for engaging an article and a flexible support arm extending between the mounting structure and the support structure, the support arm comprises a non-elastic flexible metal rod having a polygonal cross-section with opposite ends on which end sleeves with corresponding polygonal axial openings are mounted so as to be snugly connected to the ends of the polygonal metal rod in a rotationally form-locking manner while the end sleeves are firmly mounted in sockets formed on the mounting and support structures of the support device.

7 Claims, 1 Drawing Sheet

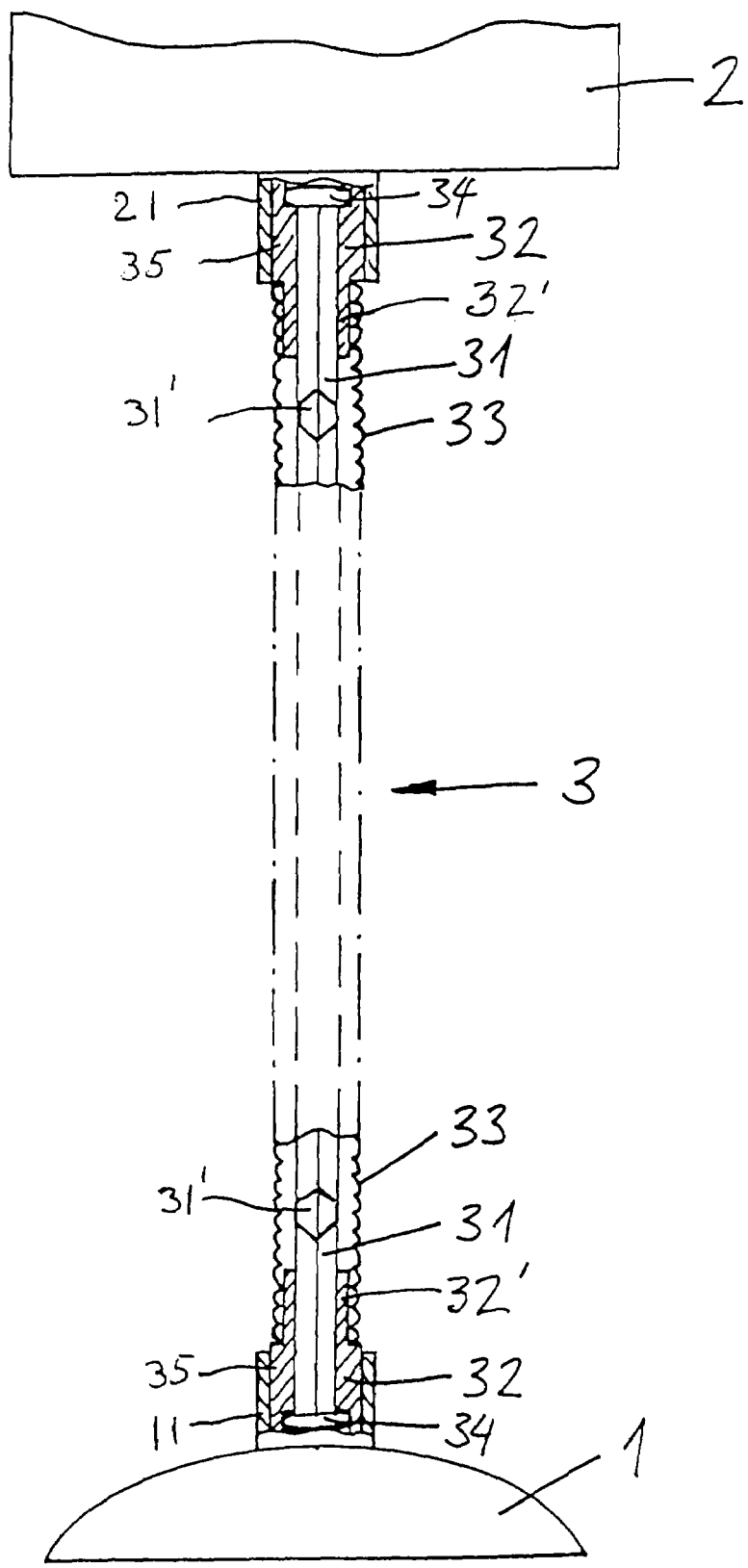

SUPPORT DEVICE WITH FLEXIBLE SUPPORT ARM

BACKGROUND OF THE INVENTION

The invention relates to a support device with a flexible support arm for use for example in a motor vehicle for supporting an apparatus such as a cellular telephone or a navigation apparatus, wherein the support device comprises a mounting structure, for example, a suction mechanism for its attachment to a smooth surface such as a windshield or a base plate which can be screwed to a console, further a support structure for receiving and retaining the respective device and a flexible support arm extending between the mounting structure and the support structure so that, by appropriate bending of the support arm the support structure with the apparatus can be moved into a position as desired by the user of the apparatus.

Such a support arm is known for example from applicant's U.S. Pat. No. 6,032,910.

The support arm disclosed therein comprises a flexible metal rod, specifically an aluminum rod, which can be bent non-elastically so that it retains its shape to which it has been bent and which is disposed in a flexible plastic tube, particularly a corrugated plastic tube, which has a diameter larger than the metal rod. At its opposite ends, plastic sleeves are mounted onto the rod which are connected to the mounting—and, respectively, support structures. In order to provide for a durable connection between the round flexible metal rod and the plastic sleeves the metal rod is flattened at its opposite ends so as to have a rectangular cross-section and is inserted into a correspondingly formed opening in the plastic sleeve and cemented to the plastic sleeve. In this way, relative rotation between the plastic sleeve and the metal rod is prevented. In addition, the end of the metal rod may be slightly upset to provide for firm form-fitting engagement between the metal rod and the end-sleeves.

It is the object of the present invention to provide a support device with a flexible arm of the type described above which however can be manufactured at lower expenses that is in a less labor-intensive manner.

SUMMARY OF THE INVENTION

In a support device with a flexible support arm including a mounting structure for mounting the support device to a base, a support structure for engaging an article or apparatus and a flexible support arm extending between the mounting structure and the support structure, the support arm comprises a non-elastic flexible metal rod having a polygonal cross-section with opposite ends on which end sleeves with corresponding polygonal axial openings are mounted so as to be snugly connected to the ends of the polygonal metal rod in a rotationally form-locking manner while the end sleeves are firmly mounted in sockets formed on the mounting and support structures of the support device.

The invention will be described below in greater detail on the basis of the accompanying drawings.

BRIEF DESCRIPTION OF THE DRAWINGS

The sole FIGURE shows schematically and partially in a sectional view the support device according to the invention.

DESCRIPTION OF A PREFERRED EMBODIMENT

As shown in the FIGURE, the support device includes a support arm 3 comprising an essentially non-elastic bendable metal rod 31 consisting for example of an aluminum alloy. The metal rod 31 has a cross-section so selected that, on one hand, it has the required mechanical strength, but on the other hand, can be bent by hand in the desired way. At its opposite ends, the metal rod 31 is provided with plastic sleeves 32 by way of which the metal rod 31 is connected to a mounting structure 1 and to a support structure 2 and also to a corrugated plastic tube 33, which extends between the mounting structure 1 and the support structure 2 and surrounds the metal rod 31 in spaced relationship. The corrugated plastic tube provides only for an attractive appearance and hides any unevenly bent sections of the metal tube. The ends of the corrugated plastic tube are supported on cylindrical extension 32' of the plastic sleeves 32.

In the arrangement according to the present invention, the metal rod 31 in the support arm 3 has a polygonal cross-section, particularly a hexangular cross-section, as indicated at 31', that is, the whole rod 31 is not round but polygonal. In accordance therewith, the respective end sleeves 32 have corresponding polygonal openings in which the ends of the polygonal rod are snugly received so as to be firmly, non-rotationally engaged with the sleeves 32. Such extruded polygonal rods are commercially available essentially at the same price as corresponding round rods.

Preferably, the ends of the rod 31 extend slightly beyond the sleeves 32 and are upset so as to provide an expanded end portion 34 to prevent the rod from axially sliding out of the sleeves 32. Additionally, the ends of the metal rods 31 may be cemented into the end sleeves 32.

At their axial ends 35, the plastic sleeves 32 are roughened or knurled so that the ends 35 can be tightly received in corresponding sockets 11 and 21 of the mounting structure 1 and the support structure 2, respectively to which they may additionally be cemented.

What is claimed is:

1. A support device with a flexible support arm (3), comprising a mounting structure (1) for mounting said support device to a support base and a support structure (2) for engaging an article, said flexible support arm (3) extending between said mounting structure (1) and said support structure (2) and comprising a non-elastic, flexible metal rod (31) having over its full length a polygonal cross-section with opposite ends, and end sleeves (32) having polygonal axial openings corresponding to the polygonal cross-section of said metal rod (31) mounted onto the opposite ends of said polygonal metal rod (31) so as to be snugly connected to the ends of said polygonal metal rod in a rotationally form-locking manner.

2. A support device according to claim 1, wherein the ends of said metal rod (31) extend beyond said end sleeves (32) and are upset at their ends for axially locking said metal rod ends in said end sleeves (32).

3. A support device according to claim 1, wherein said metal rod ends are additionally cemented into said end sleeves (32).

4. A support device according to claim 1, wherein said plastic sleeves (32) have cylindrical extensions (32') projecting toward each other and a corrugated plastic tube (33) is supported with its opposite ends on said cylindrical extensions and extends around said metal rod (31) in radially spaced relationship therefrom.

5. A support device according to claim 4, wherein said plastic tube (33) is a corrugated flexible plastic tube.

6. A support device according to claim 1, wherein said end sleeves (32) consist of plastic and have opposite ends which are fastened in corresponding sockets (11, 21) of said mounting structure (1) and said support structure (2) respectively.

7. A support device according to claim 1, wherein said polygonal rod (31) is a hexagonal rod.

* * * * *